(No Model.)

B. TRUXAL.
DETACHABLE COLLAR FOR SHAFTING.

No. 370,168. Patented Sept. 20, 1887.

Witnesses:
W. C. Jirdinston.
Frank D. Loveland

Inventor:
Benjamin Truxal,
by his Attorneys
Parstinson & Parstinson

UNITED STATES PATENT OFFICE.

BENJAMIN TRUXAL, OF CHATTANOOGA, TENNESSEE.

DETACHABLE COLLAR FOR SHAFTING.

SPECIFICATION forming part of Letters Patent No. 370,168, dated September 20, 1887.

Application filed June 24, 1887. Serial No. 242,345. (No model.)

*To all whom it may concern:*

Be it known that I, BENJAMIN TRUXAL, a citizen of the United States, residing at Chattanooga, in the county of Hamilton and State of Tennessee, have invented certain new and useful Improvements in Detachable Collars for Shafting, of which the following is a specification.

The object of my invention is to provide a collar which may be attached to or removed from shafting without displacing or disconnecting the shafting, and it is applicable to slip-collars, shaft-couplings, &c.

The invention consists in a detachable collar composed of a longitudinally-separable sleeve in combination with one or more longitudinally-separable nuts.

Figure 1:
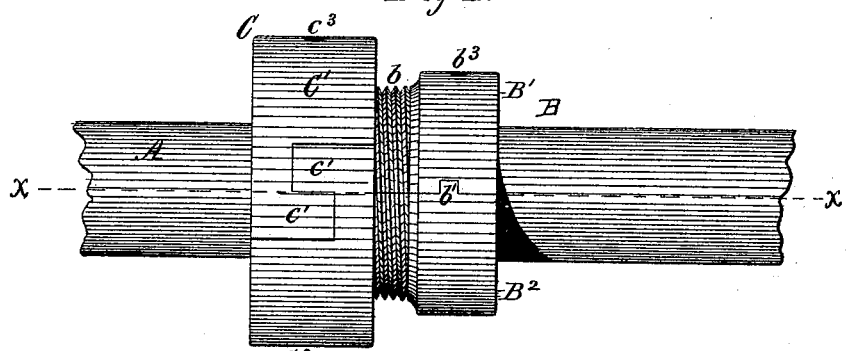
Figure 2:
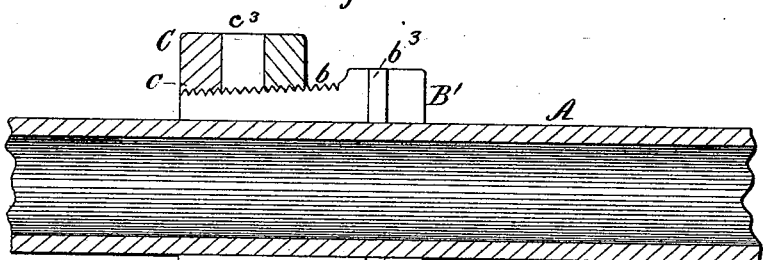
Figure 3:
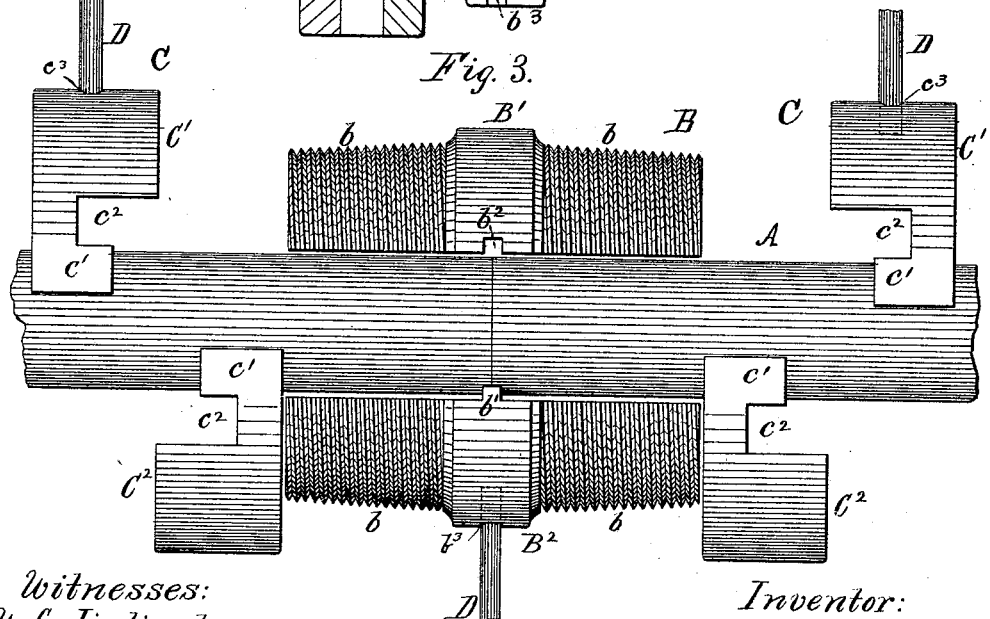

In the drawings, Figure 1 shows a shaft with a slip-collar embodying my invention mounted thereon. Fig. 2 is a longitudinal sectional view on the line $x\ x$ of Fig. 1. Fig. 3 shows a line of shafting with a shaft-coupling embodying my invention mounted thereon, the parts in this instance being shown detached.

A is a line of shafting; B, a longitudinally-separable sleeve or hub, consisting of parts B' and B², and provided at one or both ends with an externally-threaded tapering portion, $b$. The parts B' and B² are adapted to interlock in such manner as to prevent longitudinal movement relatively to each other when in engagement. I have illustrated them as provided with tenons $b'$, adapted to take into mortises $b^2$.

C is a longitudinally-separable nut, consisting of parts C' and C², and having a tapering bore, $c$, provided with an internal thread adapted to take over the thread upon the tapering portion of the sleeve. The parts C' and C² are adapted to interlock in such manner as to permit disengagement in one or more directions, but to prevent disengagements by an expanding strain. I have illustrated them as interlocked by means of joints of the hook-butt-scarf order, consisting of projections $c'$, adapted to take into counterpart notches $c^2$.

The collar is placed upon the shafting by placing the parts of the sleeve opposite each other upon the shaft, placing the parts of the nut upon opposite sides of the shaft, bringing them into engagement with each other, and screwing the nut upon the tapering portion of the sleeve. As the internal thread of the nut engages with the external thread upon the sleeve, the parts of the nut will be locked against disengagement in any direction, and as the nut advances upon the sleeve the latter will be clamped more and more firmly to the shaft.

In order to insure sufficient frictional engagement of the sleeve with the shaft, the sections of the sleeve should together constitute an arc slightly less than a complete circle, giving the sleeve, when clamped, the effect of a split collar.

For convenience in screwing the nuts upon the sleeve, the sleeve and the nuts are provided with aperture $b^3$ and $c^3$, adapted to receive the ends of the bars or levers D.

The form shown in Figs. 1 and 2 is adapted for use for placing pulleys in position, or wherever a slip-collar may be required. For a shaft-coupling the form shown in Fig. 3 is preferable. The sleeve may serve as the hub of a split pulley.

I claim as my invention—

1. The combination of a longitudinally-separable sleeve with one or more longitudinally-separable nuts, substantially as and for the purpose specified.

2. The combination of a longitudinally-separable sleeve, having one or both ends tapered and threaded, with one or more longitudinally-separable nuts, having tapering bores, substantially as and for the purpose specified.

3. A longitudinally-separable threaded sleeve, in combination with a longitudinally-separable nut the sections of which are provided with interlocking projections, substantially as and for the purpose specified.

4. A longitudinally-separable sleeve the sections of which are adapted to interlock, thereby preventing longitudinal movement relatively to each other when in engagement, in combination with a longitudinally-separable nut the sections of which are adapted to interlock to prevent disengagement by an expanding strain, substantially as and for the purpose specified.

5. A longitudinally-separable sleeve having one or both ends tapering and threaded, the sections of said sleeve being adapted to interlock to prevent longitudinal movement relatively to each other, in combination with a longitudinally-separable nut having a tapering bore, the sections of said nut being adapted to interlock to prevent disengagement by an expanding strain, substantially as and for the purpose specified.

6. A longitudinally-separable nut, in combination with a longitudinally-separable sleeve, the sections of which together constitute an arc less than a complete circle, substantially as and for the purposes specified.

7. The separable nut C, composed of longitudinal sections C' and C², having notches $c^2$ and projections $c'$, the latter adapted to take into the former, substantially as and for the purpose specified.

BENJAMIN TRUXAL.

Witnesses:
DAVID KENYON,
JNO. B. NICKLIN.